Patented Jan. 22, 1929.

1,699,639

UNITED STATES PATENT OFFICE.

KAREL MARINUS VAN GESSEL, OF EINDHOVEN, NETHERLANDS.

OXIDE CATHODE.

No Drawing. Application filed December 24, 1925, Serial No. 77,613, and in the Netherlands February 12, 1924.

The present invention relates to the manufacture of electrodes known as "oxide cathodes" and destined for discharge tubes such as, for example, transmission or receiving valves for wireless telegraphy, telephony and similar purposes, X-ray tubes and rectifiers. Such electrodes have hitherto consisted of a body, for example of platinum coated with a layer of metal oxide yielding a very high emission of electrons as the temperature is raised, such as, for example, alkaline earth oxides.

It has been found that the manufacture of these electrodes (which were described for the first time by Wehnelt) entails various difficulties. Thus, for example, the dropping off of the layer of oxide, and the unequal heating of the layer during the use as electrodes have caused a great deal of trouble giving unreliable results.

Many proposals have already been made to improve the properties of oxide cathodes. Thus, for example, it has been suggested to apply the active layer in the form of a carbonate of an alkaline earth metal to a core of platinum and nickel. Upon heating there is first produced nickel-oxide and the alkaline earth oxide, and then a compound containing nickel and the alkaline earth oxide, said compound decomposing afterwards into nickel and the oxide.

It has also been proposed to oxidize a metal body slightly at its surface for giving it a rough surface and to immerse it thereupon in a bath of molten alkaline earth hydroxides.

The known processes have the disadvantage that frequently the layer of the active material is unequally divided and that frequently from the alkaline earth compounds hitherto used, substances are liberated which are liable to attack the metal core or to have in another manner a detrimental influence on the decomposition. When using base metals for the core there is the danger, for example, when there is an excess of oxygen, that the metal core is attacked by oxygen in such a manner that it is soon burned out. A further inconvenience of the methods above described lies in the many stages of operation which the oxide cathode has to pass through, which at the same time causes that the possibility of deterioration to the active layer and of its dropping off is increased. Also when using base metals for the core, a stable compound may be formed between the alkaline earth oxide and the core material, which compound when heated does not decompose again.

Where in this description mention is made of a core, this term is to be understood to mean not only a wire core to which the active oxide is applied but also a body of any other shape serving as a support for the active oxide.

The invention has for its object to obviate the said inconveniences, to simplify the manufacture of oxide cathodes and to obtain a firm adherence of the active oxide layer to its support.

The invention aims at the same time at rendering possible the use of the base metals as a support for the oxide layer without this support being made feeble by harmful constituent parts of the layer applied.

According to the invention, a metal body is oxidized at its surface at least partly, whereupon one or more of the alkaline earth metals are brought into contact with the said body in such a manner that at the surface of the body, alkaline earth oxides are produced. It has been found that the alkaline earth metal after being brought into contact with the oxidized metal body, is converted at least for the greater part into the oxide of the alkaline earth metal, to which probably the oxide layer of the metal body contributes in a high measure though the oxidation may also partly be produced by oxygen present in the neighbourhood of the metal body. The oxide layer applied in this manner, has proved to be firmly connected to the core, which may result perhaps from a reduction of the oxide layer of the metal body, owing to which the surface of the said body becomes porous and the active oxide deposits in the pores.

As a core should preferably be used a base metal, which may not have too low a melting point, such as, for example, tungsten, molybdenum, nickel and the like or alloys of such metals. Tungsten has proved to be very suitable for the realization of this invention. Tungsten wire is utilized in industry in various thicknesses, especially of very small diameter. It has a great tensile strength, which especially in the case of thin wires is of great importance. When the support is not used in the form of a wire, however tungsten also offers various advantages. Thus, for example, it is easily oxidized and the oxide produced not easily volatilized. Besides, owing to its high melting point tungsten is only slightly susceptible to attack by the layer at the temperature at which the oxide cathode is operated.

The alkaline earth metals may be brought into contact with the oxidized body in different ways. For example, an easily decomposable alkaline earth compound which does not contain oxygen and from which when heated the alkaline earth metal is liberated, may be applied to the surface. Thus, for example, a nitrogen compound of the alkaline earth metals such as barium azide ($BaN_6$) may be applied to the core, which compound when heated is decomposed into barium nitride, barium, and nitrogen. The barium thus liberated is probably oxidized and held by the oxide layer of the core.

The applicant found, however, that the metal body after being oxidized, should be surrounded preferably by an alkaline earth metal vapour. On carrying out the latter process, it has been found that the metal in the form of vapour is so active that it is very easily received by the core and deposits thereon as alkaline earth oxide. A further advantage of this process is that there is produced a regular layer of the active substance thereby, whilst also the resulting purity of the active layer without any admixtures, is of great importance for a good functioning as an oxide cathode.

According to one embodiment of this invention, it is advisable to bring the alkaline earth metal into contact with the oxidized body while the discharge tube is being exhausted, which affords the advantage that impurities liberated during the exhausting process are at once pumped away whilst in the case that the alkaline earth metal is brought into contact with the core in the form of vapour, this may occur in the discharge tube itself without a special exhausted space being required therefor.

The alkaline earth metal may be provided in the discharge tube in the form of an easily decomposable alkaline earth compound, said discharge tube being heated while it is being exhausted, to a temperature such that the compound decomposes and the alkaline earth metal liberated is led by volatilization to the oxidized body. For this purpose the substance to be decomposed may be applied, for example, to one or more of the electrodes and the decomposition and volatilization may be produced by heating the electrodes, while they are being deprived of occluded gases.

It has been found that although a special heating of the bodies serving as a support, is not necessary, a small degree of heating the core is desirable, which probably is conducive to the reaction between the alkaline earth metal and the oxide of the core.

The oxide cathode manufactured in accordance with this process affords various advantages. By bringing the alkaline earth metal itself into contact with the underlayer, the exposure of the latter to the action of any detrimental substances such as, for example, oxygen and the like, is prevented. The active layer which is thin and evenly spread, adheres excessively firmly to the surface and the emission capacity and the length of life of the oxide cathode manufactured in accordance with the invention, satisfy high requirements.

In order to obtain a good working of the oxide cathode, it is advisable to "age" the wire, which is effected, for example, by gradually heating the wire to a high temperature and by maintaining it for some time at that temperature. Owing to this operation the emitting capacity is materially increased.

The discharge tube according to the invention is characterized by an oxide cathode manufactured in accordance with the process of the invention. If the active layer is applied to the core of the cathode by bringing alkaline earth metal vapour into contact with the core during the exhausting process, the alkaline earth metal will deposit in the tube not only on the core but also on other parts inside the tube, for example, on the lead wires and on the wall of the tube. It has been found, however, that for most applications this deposition does not give rise to any objections the metal deposited may even work favorably as a purifying substance for a gaseous filling, if any, or for the vacuum.

The following example may serve to illustrate the invention, it being understood that the invention is not limited to this mode of operation.

A tungsten wire heated in the air to a temperature of about 700° C. owing to which it is oxidized, (which oxidation however, may also take place in any other manner) is arranged in a discharge tube as a core for the cathode. Another electrode, for example, the anode, is provided on the side which is turned to the cathode, with a small quantity of alkaline earth compounds, such as, for example, barium azide ($BaN_6$). Thereupon the tube is exhausted during which operation the anode is heated in any manner well known in the art to a temperature of about from 1100° to 1200° C. in order to expel the occluded gases. The alkaline earth metal compound provided on this electrode will be decomposed by this heating. Barium azide, for example, decomposes at about from 150 to 250° C. and at about 600–800° C. the barium liberated volatilizes. Owing to the heating during the exhausting process the wire which serves as a support for the cathode, has been heated already to such an extent (about at 450° to 500° C. in the case of a central arrangement of the cathode inside the anode) that a special heating of the cathode is superfluous. The barium is precipitated on the core and converted into the oxide, in which process probably for the greater part reduction of the oxidized metal takes place. At the same time the barium vapour will deposit for example on the wall, the lead wires and probably also on the cathode. During the operation of the discharge tube any metallic barium which might be present on the cathode, volatilizes or is soon converted into the barium oxide with the aid of the oxide layer of the metal body.

Another method for applying alkaline earth oxide to the cathode consists in immersing the electrodes mounted on a so-called stem of a discharge tube, in the easily decomposable compound such as barium azide. After the stem has been sealed into the discharge tube, the barium is brought into contact with the cathode during the exhausting process both by decomposition of the barium azide on the cathode and by volatilization away from one or more of the other electrodes.

What I claim is:

1. The method of coating the cathode of a vacuum tube which comprises oxidizing the cathode, and reducing said oxide by means of a vapor of the base of the desired coating.

2. The method of coating the cathode of a vacuum tube which comprises, partially oxidizing the cathode, and then subjecting said cathode to the vapors of barium azide.

3. The method of coating the cathode of a vacuum tube which comprises oxidizing the cathode surface, subjecting said cathode to the vapor of an alkaline earth metal, and maintaining said cathode at the reaction temperature of the alkaline earth metal and the oxide on the cathode.

4. The method of coating the cathode of a vacuum tube which comprises heating the cathode in an oxidizing medium to form an oxide coating thereon, coating said cathode with barium azide in the vaporized condition, and maintaining said cathode at a high temperature, whereby said cathode coating is reduced by said vapor.

5. In the art of vacuum tube manufacture, the process of coating a cathode having an oxidized surface which comprises heating the anode to a temperature between 1100° and 1200°, exhausting the gases from said tube, and volatilizing and decomposing an alkaline earth compound in the tube whereby the metallic alkaline earth is deposited on the cathode and reacts with the oxidized surface of the cathode.

6. A process of manufacturing oxide cathodes for discharge tubes which comprises in oxidizing a metal body at its surface at least partly, bringing thereupon one or more of the alkaline earth metals and heating the tube to drive off the occluded gases, said heating reducing the oxide coating in such a manner that alkaline earth oxide is formed at the surface of the body.

7. A process of manufacturing oxide cathodes for discharge tubes which comprises in oxidizing a metal body at its surface at least partly, bringing one or more of the easily decomposable alkaline earth metal compounds within the tube, and heating the tube to drive off the occluded gases, said heating reducing the alkaline earth metal compound to metal, and causing the alkaline earth metal to react with the oxide surface in such a manner that an alkaline earth oxide is formed at the surface of the cathode.

8. A process of manufacturing oxide cathodes for discharge tubes which comprises in oxidizing a metal body at its surface at least partly, bringing one or more of the easily decomposable alkaline earth metal azides within the tube, and heating the tube to drive off the occluded gases, said heating reducing the alkaline earth azides to metal and causing the alkaline earth metal to react with the oxide surface in such a manner that an alkaline earth oxide is formed at the surface of the cathode.

KAREL MARINUS VAN GESSEL.